US006941244B1

(12) United States Patent
Saito et al.

(10) Patent No.: US 6,941,244 B1
(45) Date of Patent: Sep. 6, 2005

(54) OFF-LINE DIAGNOSIS SYSTEM

(75) Inventors: Yoji Saito, Musashino (JP); Kazuhiro Hashizumi, Musashino (JP); Alex Legere, Avon, MA (US); Hongli Du, Avon, MA (US)

(73) Assignee: Dresser, Inc., Addison, TX (US)

( * ) Notice: Subject to any disclaimer, the term of this patent is extended or adjusted under 35 U.S.C. 154(b) by 34 days.

(21) Appl. No.: 10/665,791

(22) Filed: Sep. 18, 2003

(30) Foreign Application Priority Data

Sep. 30, 2002 (JP) .............................. 2002-286153

(51) Int. Cl.[7] .................. G06F 11/30; G05B 17/00
(52) U.S. Cl. .................. 702/183; 702/33; 702/182; 702/186; 700/275
(58) Field of Search .................. 702/31, 32, 33, 702/81, 182, 183, 186, 187, 188; 700/83, 700/104, 117, 275, 280; 706/60

(56) References Cited

U.S. PATENT DOCUMENTS

| 4,976,144 A | 12/1990 | Fitzgerald |
| 5,109,692 A | 5/1992 | Fitzgerald |
| 5,197,328 A | 3/1993 | Fitzgerald |
| 5,687,098 A | 11/1997 | Grumstrup et al. |
| 5,892,690 A | 4/1999 | Boatman et al. |
| 5,970,430 A * | 10/1999 | Burns et al. ............. 702/122 |
| 6,049,764 A * | 4/2000 | Stahl ....................... 702/183 |
| 6,272,401 B1 | 8/2001 | Boger et al. |

FOREIGN PATENT DOCUMENTS

| JP | 10-336238 | 12/1998 |
| WO | WO 01/11436 A1 | 2/2001 |

OTHER PUBLICATIONS

European Patent Office, European Search Report for Application No. EP 03 40 0057 dated Feb. 4, 2005 (3 pages).

* cited by examiner

*Primary Examiner*—Bryan Bui
(74) *Attorney, Agent, or Firm*—Fish & Richardson P.C.

(57) ABSTRACT

Process control systems may include one or more diagnostic systems and/or processes. In particular implementations, a diagnostic system and process for a field instrument may include the ability to divide a signal input range into a plurality of zones with respect to an input axis or a time axis, measure input response characteristics for a zone with the field instrument, and store measurement data points for the zone in memory of the field instrument. The diagnostic system and process may also include the ability to transmit the measurement data points for the zone to a host application and, while transmitting the measurement data points for the zone, measure input response characteristics for a second zone with the field instrument.

18 Claims, 4 Drawing Sheets

OFF-LINE DIAGNOSIS SYSTEM

BACKGROUND OF THE INVENTION

1. Field of the Invention

The present invention relates to an off-line diagnosis system in a process control system comprising a host application and field instruments that perform digital communication with the application.

2. Description of the Prior Art

In the prior Japanese patent application 2002-113820 "Off-line diagnosis system," the applicant has disclosed technology concerning an off-line diagnosis system in a process control system comprising a host application and field instruments that perform digital communication with the application.

FIG. 1 is a function block diagram illustrating the technological details of the prior patent application. Block 1 denotes a field instrument (for example, valve positioner), which communicates with a host system to perform process control (measurement, operation, monitoring, etc.). In block 1, numeral 101 denotes a data transmit means, number 102 denotes a data analyzing means, numeral 103 denotes an input-output characteristics measurement means, and numeral 104 denotes a step response measurement means.

Block 2 denotes a host application that runs on a PC or DCS. In block 2, numeral 201 denotes a data receiving means, numeral 202 denotes a data analyzing means, and numeral 203 denotes a data display means. Numeral 3 denotes a digital 1 communication bus that connects between the data transmit means 101 of the field instrument and the data receiving means 201 of the host application.

Note here that the digital communication mentioned above means communication based, for example, on a communication protocol for the process industry, such as Foundation Fieldbus, PROFIBUS, HART or BRAIN.

Both the data analyzing means 102 and 202 may be provided in either field instrument 1 or host application 2, or may be omitted in cases where the operator himself/herself makes analyses using measured data.

If field instrument 1 is a valve positioner, the input-output characteristics of a control valve or a positioner are measured by input-output characteristics measurement means 103, step responses (response characteristics including those of valves) are measured by step response measurement means 104, and the data thus measured are analyzed by the data analyzing means as necessary and uploaded to the data receiving means 201 of host application 2 through data transmit means 101 and digital communication bus 3.

In host application 2, the measured data or analyzed data that has been received is further analyzed by data analyzing means 202 at higher levels as necessary, and the results of analysis are displayed by data display means 203.

In such a system configuration as described above, assume that the speed of communication between data transmit means 101 and data receiving means 201 is insufficient. Then, in such a type of communication as 1200 bps HART communication, the system would not be considered to have a sufficiently high speed to perform real-time processing, though it can successively receive and display measurement results. Therefore, in order to solve the communication speed problem which causes a bottleneck, a practical system requires data memory means as buffers for temporarily retaining measured data within field instrument 1 and host application 2.

To be specific, the data memory means in this case refers to memory resources. Memory resources are also used for other types of signal processing and, therefore, it is sometimes difficult in terms of cost to secure sufficient memory to store the required data.

On the other hand, in measurement for diagnostic purposes, there is a demand for increasing the number of measurement points as much as possible in order to increase the resolution and thereby ensure measurement accuracy, or for obtaining response characteristics data composed of a plurality of step responses. However, it may not be possible to satisfy such a demand if the capacity of data memory means is insufficient.

An object of the present invention is to provide an off-line diagnosis system whereby the measurement resolution (number of measurement points) can be increased in order to obtain detailed input-output characteristics, and step response characteristics can be obtained at a sufficient frequency and more efficiently, without expanding the physically limited memory capacity of a field instrument or host application.

SUMMARY OF THE INVENTION

The constitution of the present invention made to achieve the foregoing object is as follows:

(1) An off-line diagnosis system comprising:

a field instrument that relates to process control and has a self-diagnosis function or a valve diagnosis function; and a host application that performs digital communication with the field instrument, wherein the self-diagnosis of the field instrument is executed or the diagnosis of a valve is executed during an off-line interval and diagnosis results are transmitted to the host application, and wherein the signal input range of the field instrument or the valve is divided into a plurality of zones with respect to the time axis or input axis, and the diagnosis results of each zone are successively transmitted to the host application.

(2) The off-line diagnosis system of item (1), wherein the field instrument retains the diagnosis results data of one zone among the plurality of zones in data memory means with a given memory capacity and, while transmitting the retained data to the host application, also retains the diagnosis results data of another zone in the data memory means to communicate the retained data to the host application.

(3) The off-line diagnosis system of item (1) or (2), wherein the self-diagnosis or valve diagnosis is based on input-output characteristics measurement in which an input is given to the field instrument or valve and then the output value thereof is measured.

(4) The off-line diagnosis system of item (1) or (2), wherein the self-diagnosis or valve diagnosis is based on measurement of response characteristics in which a step input is given to the field instrument and then the output value thereof is measured.

(5) The off-line diagnosis system of any of items (1) to (4), wherein data analyzing systems are provided in either the field instrument or host application or in both.

(6) The off-line diagnosis system of any of items (1) to (5), wherein the field instrument is a valve positioner.

(7) The off-line diagnosis system of any of items (1) to (5), wherein the field instrument is an electro-pneumatic converter.

DETAILED DESCRIPTION OF THE PREFERRED EMBODIMENTS

Figure 1:
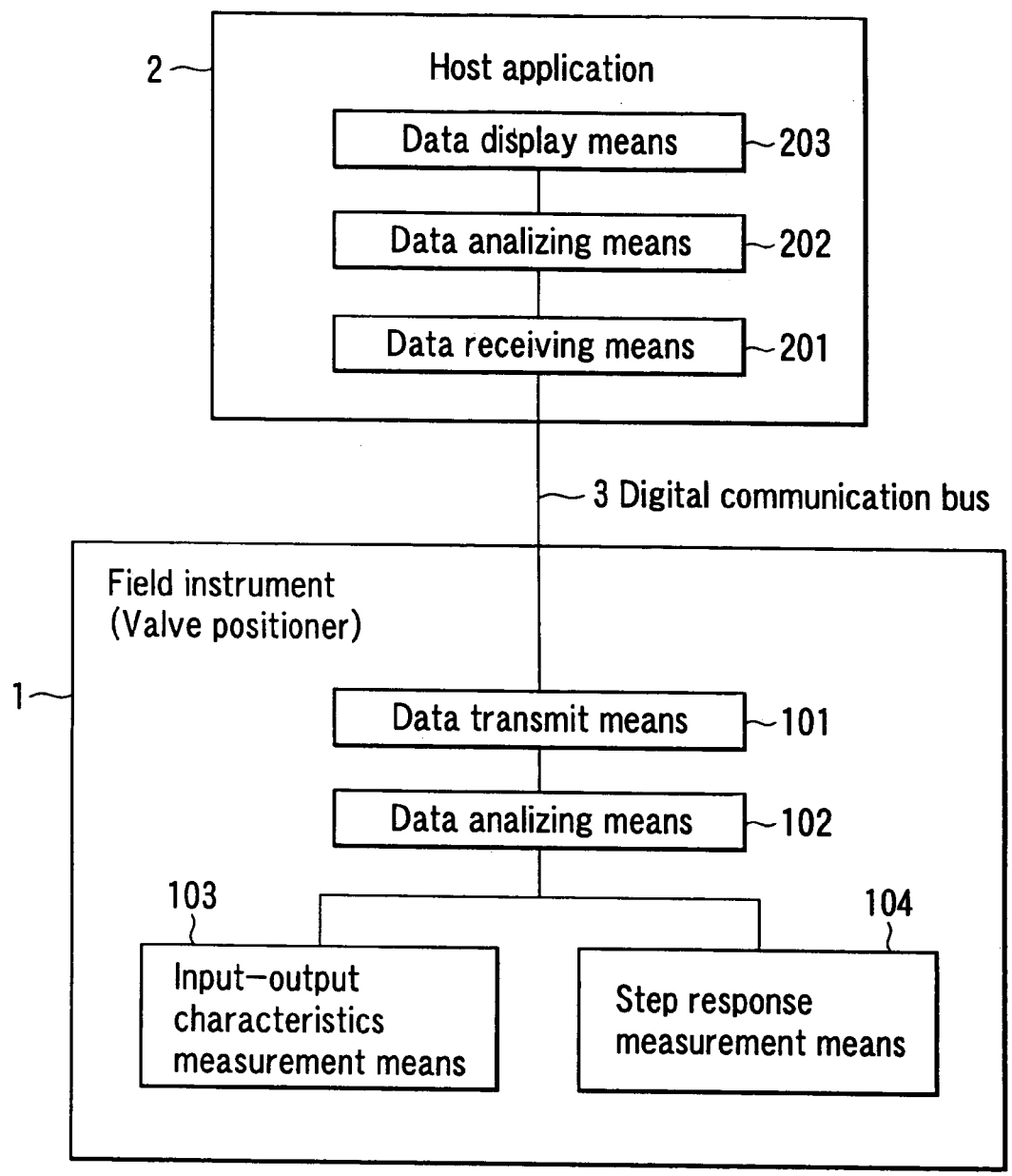
FIG. 1 is a function block diagram illustrating an example of the prior art off-line diagnosis system.
Figure 2:
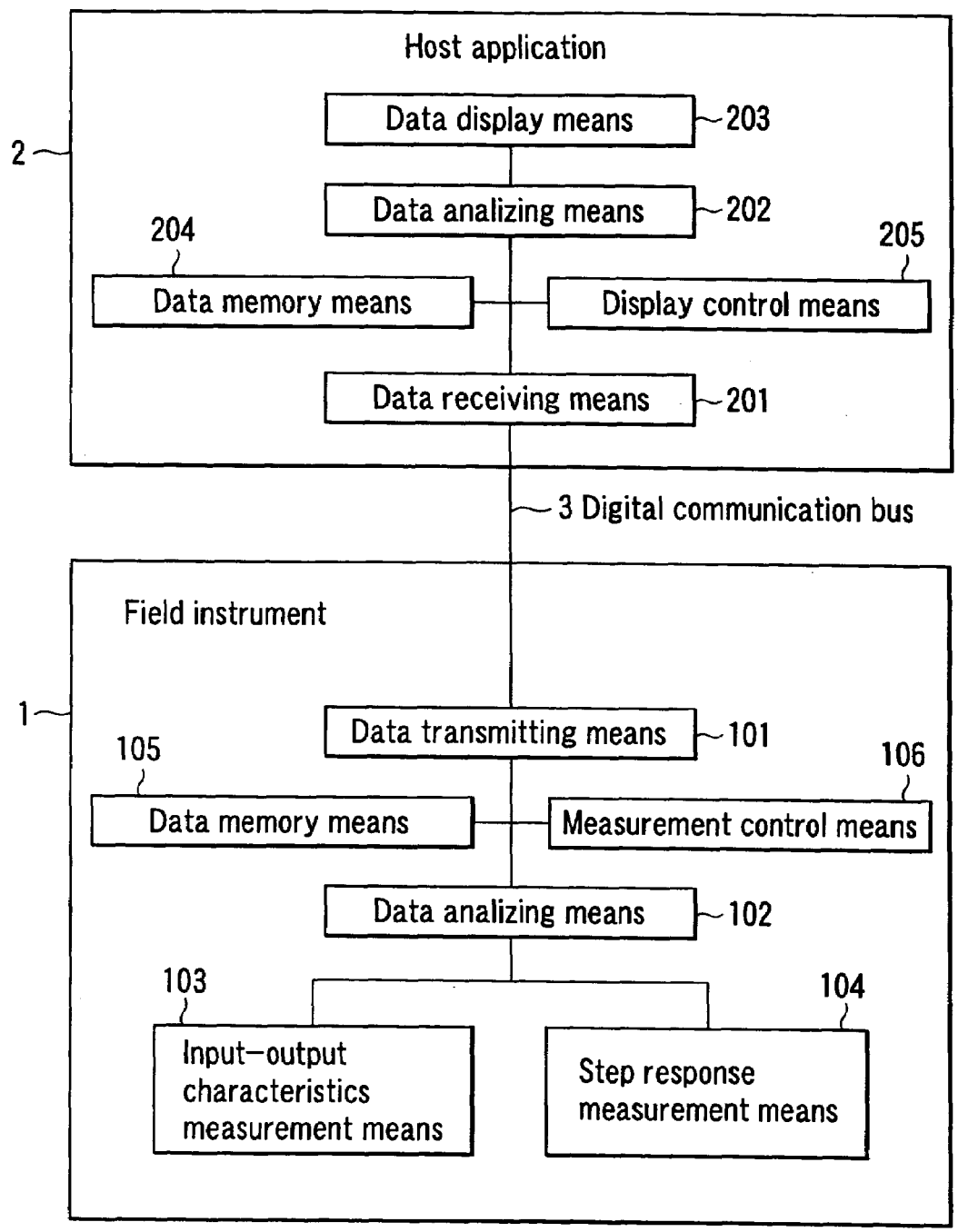
FIG. 2 is a function block diagram illustrating an example of an off-line diagnosis system to which the present invention has been applied.

Preferred embodiments of the present invention will now be described with reference to the accompanying drawings. FIG. 2 is a function block diagram illustrating an example of an off-line diagnosis system to which the present invention has been applied. Elements identical to those discussed in the prior art system of FIG. 1 are referenced alike and excluded from the description hereunder.

In contrast to the prior art system, the system of the present invention is characterized by a configuration in which data memory means 105 and measurement control means 106 are provided in field instrument 1, and data memory means 204 and display control means 205 are provided in host application 2.

The methods of measurement for diagnostic purposes described in the present invention are characterized by the features that the range of dummy inputs is divided into a plurality of zones in field instrument 1 and the diagnosis results of each zone are successively communicated to host application 2.

More specifically, using the functions of measurement control means 106, the diagnosis results data of one zone among a plurality of zones is retained in data memory means 105 with a given capacity.

While transmitting the retained data to the host application, field instrument 1 stores the diagnosis results data of another zone in the data memory means after resetting or overwriting the previous data, and communicates the stored data to host application 2.

In host application 2, the diagnosis results data of one zone received from field instrument 1 is retained in data memory means 204 using the functions of display control means 205 that works in conjunction with measurement control means 106, analyzed by data analyzing means 202, and then displayed by data display means 203.

When the diagnosis results data of another zone is transmitted from field instrument 1, the data is retained in data memory means 204 and the same processing is executed.

Now the measurement methods that characterize the present invention will be described according to FIGS. 3 and 4.

Figure 3:
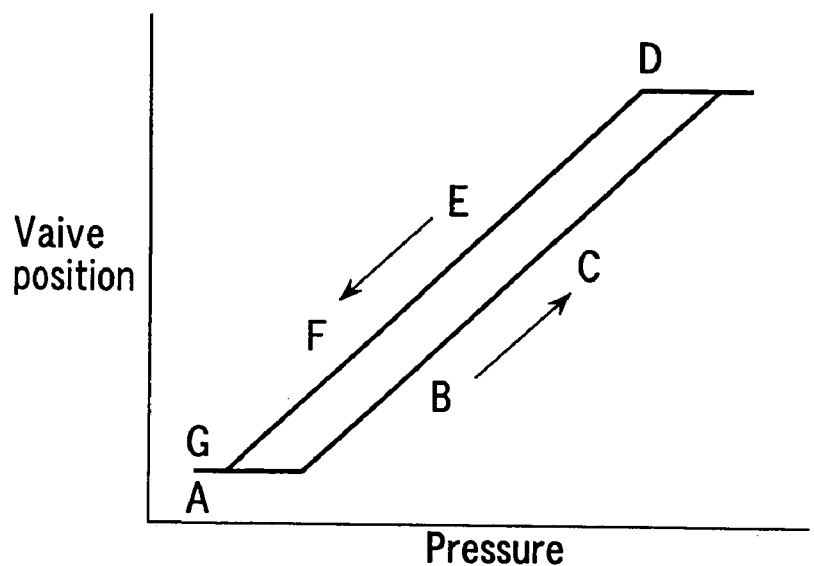
FIG. 3 is a conceptual view showing the method of measuring the input-output characteristics of a valve positioner having hysteresis.

FIG. 3 is a conceptual view showing the method of measuring the input-output characteristics of a valve positioner having hysteresis.

If the data retention capacity of data memory means 105 is n1 measurement points and it is necessary to measure more than n1 points in order to increase the resolution, then the input range of a signal (pressure signal in this case) for diagnosis is divided into a plurality of zones.

In other words, the hysteresis cycle is divided into zones across the path from point A to point G. Then, n1 points are measured in zone A-B and, while the measured data is being transmitted to host application 2, another n1 points are measured in zone B-C. Consequently, it is now possible to measure a number of points greater than n1.

Since the number of zones is 6 in the example of FIG. 2, the following equation holds true assuming the total number of measurement points is n2.

$$n2 = n1_x(\text{number of zones}) = n1_x 6$$

Thus, the resolution is increased by a factor of 6.

Figure 4:
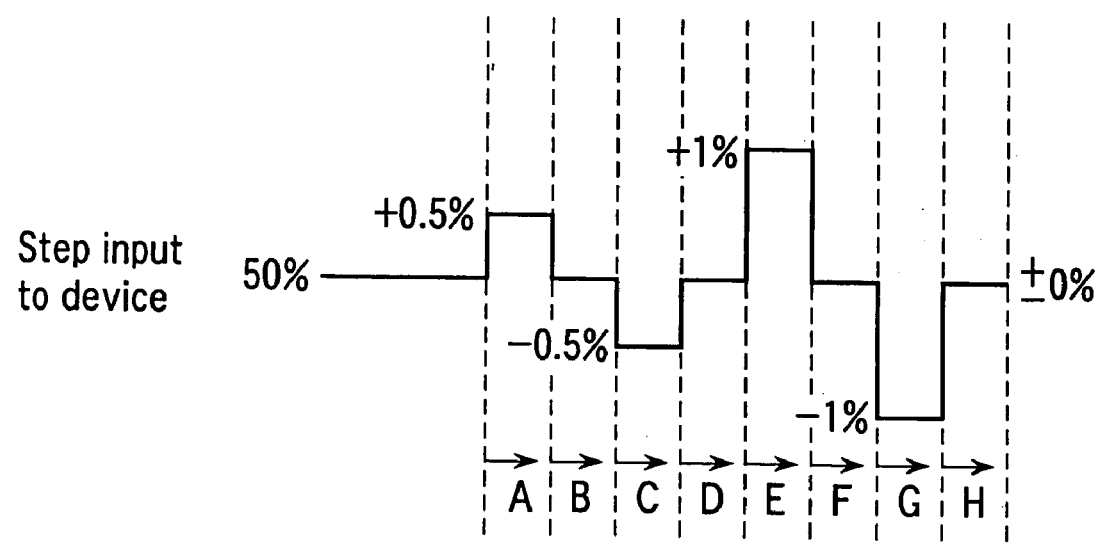
FIG. 4 is a conceptual view showing the method of measuring the step response characteristics of a valve positioner.
Figure 5:
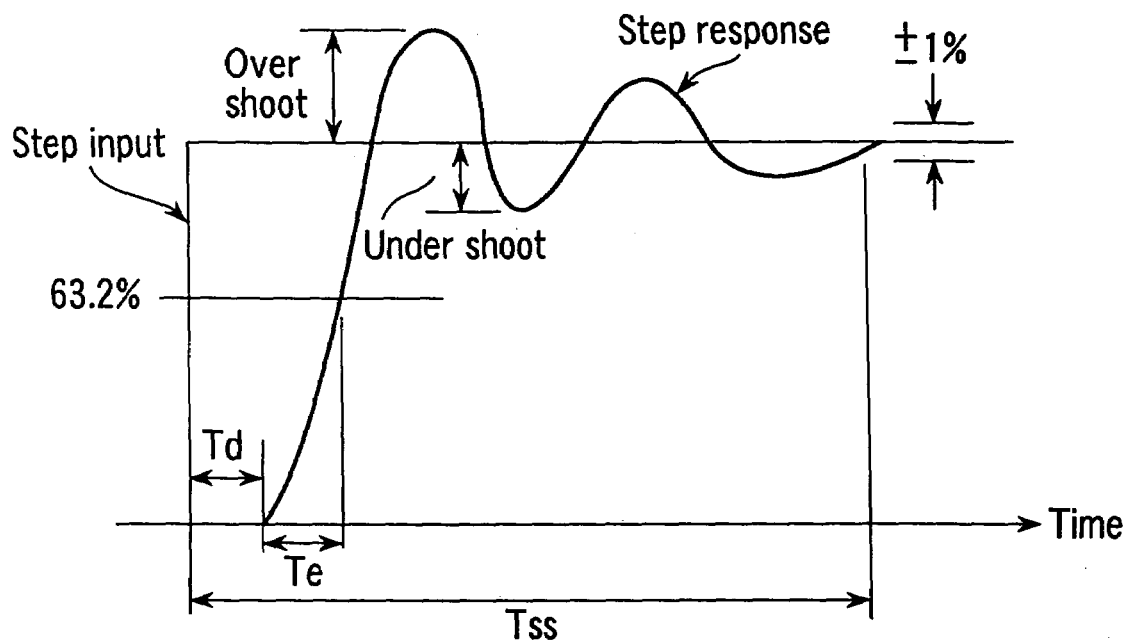
FIG. 5 is a characteristic graph typical of a step response.

FIG. 4 is a conceptual view showing the method of measuring such step response characteristics of a valve positioner as illustrated in FIG. 5. In this example, eight zones from zone A to zone H are measured.

In each zone, n1 points are measured and another step input is given after the completion of measurement of each zone.

In the above-discussed example, dummy inputs at levels around the median level of 50% are given: 50.5% in zone A, 50% in zone B, 49.5% in zone C, 50% in zone D, 51% in zone E, 50% in zone F, 49% in zone G, and 50% in zone H, thus acquiring n1 items of step response data for each zone.

Consequently, the total number of measurement points amounts to $n1_x 8$.

FIG. 5 is a characteristic graph typical of a step response.

Since parameters or the like to be measured and analyzed are well-known, they are not described here.

Other possible methods of providing inputs for measurement of step response characteristics include gradually increasing (or decreasing) the step width, for example, from 0.5% to 1%, 2%, 5%, 10%, and to 20% to test the valve positioner. Alternatively, inputs may be provided at a specific step interval, for example, from 0%, to 25%, 50%, 75%, 100%, 75%, 50%, 25%, and to 0%, to test the up-down step response characteristics of the valve positioner.

As described above, there is no need for repetitively and manually setting the input level from the host application each time the level needs to be changed, thus ensuring extremely high efficiency in measurement of step response characteristics.

In the description of embodiments in accordance with the present invention, although discussions have been made with regard to cases where a valve positioner is adopted as the field instrument, the embodiments may also be applied to the self-diagnosis of the input-output characteristics of an electro-pneumatic converter or motor valve. Furthermore, the embodiments may also be applied to general field instruments other than control means, such as valve positioners or motor valves.

As is evident from the description heretofore given according to the present invention, it is possible to measure data points beyond the capacity of data memory means of a field instrument and thereby to increase the resolution. It is thus possible to easily diagnose valves for a stick-slip phenomenon, for example, that cannot be detected unless a large number of measurement points is sampled.

Furthermore, it is possible to verify the required performance at a time by measuring combined patterns of user-specified particular step responses.

Accordingly, it is possible to easily obtain measured data that is easy to use and useful for users. This advantage will help improve the efficiency of self-diagnosis of field instruments or valves.

What is claimed is:

1. An off-line diagnosis system comprising:
a field instrument for use in a process control system, the instrument having capability to perform, during an off-line interval, a diagnosis function over a signal input range, wherein the diagnosis function is one of a self-diagnosis function and a valve diagnosis function, and the signal input range is divided into a plurality of zones with respect to an input axis or a time axis; and
a host application in digital communication with the field instrument, wherein diagnosis results of each zone are successively transmitted to the host application.

2. The system of claim 1, wherein the field instrument comprises memory of a predetermined capacity having diagnosis results of one zone stored therein, and the field instrument is adapted to transmit to the host application diagnosis results of the one zone while storing in memory diagnosis results of another zone.

3. The system of claim 1, wherein the diagnosis function is based on input-output characteristics measurement, wherein an input is given to the object being diagnosed and then an output value thereof is measured.

4. The system of claim 1, wherein the diagnosis is based on a step input given to the object being diagnosed.

5. The system of claim 1, wherein the field instrument is a valve positioner.

6. The system of claim 1, wherein the field instrument is an electro-pneumatic converter.

7. A diagnosis system comprising:
a field instrument for use in a process control system, the instrument adapted to perform a diagnosis function during an off-line interval including dividing a signal input range into a plurality of zones with respect to a time axis and successively measuring diagnosis results for each zone; and
a host application digitally coupled to the field instrument to receive the diagnosis results for each zone of the plurality of zones, wherein the field instrument successively communicates diagnosis results for each zone to the host application.

8. The system of claim 7, wherein the field instrument comprises memory having maximum capacity for a predetermined number of data measurement points and the number of data points measured for each zone equal the predetermined number.

9. The system of claim 7, wherein the field instrument is a valve positioner.

10. The system of claim 7, wherein the field instrument is an electro-pneumatic converter.

11. The system of claim 7, wherein the diagnosis function is a self-diagnosis function.

12. The system of claim 7, wherein the diagnosis function is a valve diagnosis.

13. A method of improving diagnosis resolution in a field instrument of a process control, the method comprising:
dividing a signal input range into a plurality of zones with respect to an input axis or a time axis;
measuring with the field instrument input response characteristics for each zone, including storing data point measurements for each zone in memory of a predetermined capacity of the field instrument; and
successively communicating the data point measurements for each zone to memory of a host application in digital communication with the field instrument, wherein the number of data point measurements communicated to the host application is greater than the capacity of the memory of the field instrument.

14. The method of claim 13, wherein measuring input response characteristics comprises measuring step input characteristics.

15. A method of improving diagnosis resolution in a field instrument of a process control, the method comprising:
dividing a signal input range into a plurality of zones with respect to an input axis or a time axis;
measuring input response characteristics for a zone with the field instrument;
storing measurement data points for the zone in memory of the field instrument;
transmitting the measurement data points for the zone to a host application; and
while transmitting the measurement data points for the zone, measuring input response characteristics for a second zone with the field instrument.

16. The method of claim 15, comprising successively transmitting the data measurement points for all the plurality of zones to the host application.

17. A method of performing a valve diagnosis with a valve positioner, comprising:
dividing a signal input range into a plurality of zones with respect to a time axis;
measuring input response characteristics for each zone with the valve positioner;
successively storing data point measurements for each zone in memory of the valve positioner; and
successively communicating the data point measurements for each zone to memory of a host application in digital communication with the valve positioner.

18. A method of performing a self-diagnosis with a valve positioner, comprising:
dividing a signal input range into a plurality of zones with respect to a time axis;
measuring input response characteristics for each zone with the valve positioning; and
successively storing and communicating data point measurements for each zone to memory of a host application, wherein the valve positioner transmits the data point measurements for one of the plurality of zones to the host application while measuring the data points for a successive zone of the plurality of zones.

* * * * *